(12) United States Patent
Toquet

(10) Patent No.: US 6,737,609 B2
(45) Date of Patent: May 18, 2004

(54) ARC WELDING DEVICE FOR GAS SHIELDED WELDING

(76) Inventor: Bernard Toquet, Domaine de Garay, F-43800, Chamalières sur Loire (FR)

( * ) Notice: Subject to any disclaimer, the term of this patent is extended or adjusted under 35 U.S.C. 154(b) by 0 days.

(21) Appl. No.: 10/245,645

(22) Filed: Sep. 17, 2002

(65) Prior Publication Data

US 2003/0038154 A1 Feb. 27, 2003

Related U.S. Application Data

(63) Continuation-in-part of application No. PCT/FR01/00763, filed on Mar. 15, 2001.

(30) Foreign Application Priority Data

Mar. 17, 2000 (FR) ............................................. 00 03617

(51) Int. Cl.$^7$ ............................................. B23K 9/133
(52) U.S. Cl. .................................. 219/137.71; 219/136
(58) Field of Search .......................... 219/137.71, 137.7, 219/137.2, 136, 75

(56) References Cited

U.S. PATENT DOCUMENTS

| | | | | |
|---|---|---|---|---|
| 3,339,057 A | * | 8/1967 | Bernard et al. ........... | 219/137.7 |
| 3,940,586 A | * | 2/1976 | Stearns et al. ................ | 219/75 |
| 4,150,772 A | | 4/1979 | Auer ............................ | 226/90 |
| 4,441,012 A | * | 4/1984 | Risbeck et al. ......... | 219/137.71 |
| 4,687,899 A | | 8/1987 | Acheson .................... | 219/76.14 |
| 4,780,594 A | * | 10/1988 | Rothermel .............. | 219/137.71 |
| 4,791,271 A | | 12/1988 | Thompson ................... | 219/136 |
| 4,873,419 A | | 10/1989 | Acheson .................... | 219/125.1 |

FOREIGN PATENT DOCUMENTS

| | | | | |
|---|---|---|---|---|
| DE | 1 080 818 A2 | 3/2001 | ........... | B23K/9/133 |
| FR | PCT/FR95/01045 | 8/1995 | ........... | B23K/9/022 |

* cited by examiner

*Primary Examiner*—Clifford C. Shaw
(74) *Attorney, Agent, or Firm*—Gordon & Jacobson, P.C.

(57) ABSTRACT

A welding device comprises a casing, a power supply unit, a carriage for continuous delivery of filler wire, conduit that carries filler wire to an outlet nozzle, and at least one motor. First wire drive means, mechanically coupled to the motor (s), imparts reciprocating movement to filler wire that is carried in the conduit to the outlet nozzle. Second wire drive means, mechanically coupled to the motor(s), imparts continuous movement to filler wire that is carried in the conduit to the outlet nozzle. A single controller is adapted to control the motor(s) to obtain desired kinematic movement of the filler wire, preferably giving the filler wire the same kinematics as a welder's hand. The motor parameters and corresponding kinematic characteristics of the filler wire is adjusted by the single controller in response to a single operator actuated adjustment means. Preferably, a single motor is mechanically coupled to the first and second wire drive means to impart desired kinematic movement of the wire during operation thereof.

32 Claims, 1 Drawing Sheet

ARC WELDING DEVICE FOR GAS SHIELDED WELDING

CROSS REFERENCE TO RELATED APPLICATIONS

This application is a continuation-in-part of PCT/FR01/00763 filed on Mar. 15, 2001.

BACKGROUND OF THE INVENTION

1. Technical Field

The present device relates to the technical field of welding and, more particularly, to inert-gas shielded welding.

2. State of the Art

Until recently, welds were produced entirely manually by an operator who held the metal welding wire in one hand and the torch providing the power needed to melt the wire in the other hand.

There later appeared portable devices that reproduce the movement of the operator's hand which held the wire. Such known devices are disclosed, for example, in patent FR 2 723 330.

The semi-automatic welding device described in that patent makes it possible, firstly, to free up the operator's hand holding the wire and, secondly, to provide a uniform overall feed movement of the filler wire at the same time as a combined reciprocating movement of the filler wire.

Such a device has allowed the time spent by an operator welding, and likewise the quality of work performed, to be substantially increased since the filler wire feed is more uniform. In addition, the work is carried out more quickly and thus the time spent heating the metal workpieces to be welded is reduced, consequently reducing the risk of deforming the workpieces that it is desired to weld and therefore reducing raw material wastage and saving time.

All these advantages have the result that the costs associated with the welding operations are reduced, owing to a substantial increase in productivity and less material wasted.

The movement of filler wire providing all these advantages is obtained in that device of the prior art by means of two motor drives for the filler wire.

These two motor drives are independent of each other and controlled by independent controls, one allowing the continuous feed speed of the filler wire to be varied by means of a first motor and the other allowing the frequency of the reciprocating movement to be varied by means of a second motor.

The function of the first motor drive is to impart to the filler wire a uniform feed movement so that the welding torch is uniformly supplied with filler wire.

The function of the second motor drive is to impart to the filler wire a forward and backward or reciprocating movement of the filler wire (stepwise movement), thereby reliably reproducing the movement of the operator's hand applied to the wire.

To fulfill these functions, namely the continuous feed movement of the filler wire and the reciprocating movement, the device according to the prior art comprises filler wire drive means which are motors.

These motors are typically of the low-voltage type and actuate one or more means for transferring the rotational movement to drive rollers on which the filler wire rests, the wire being applied against the drive rollers by means of a backing rollers, which allows the filler wire to be driven and continuously fed.

The drive rollers which are present on a support plate are themselves given a reciprocating movement by means suitable for imparting a reciprocating movement to said support plate. The combined two movements give the filler wire a movement identical to that which a skilled welder would impart to a filler wire used for the welding.

The second motor may be coupled directly to a cam having at least two bearing points, or to a support coupled to a connecting rod which acts on the support plate which also carries the rollers that provide continuous feed of the filler wire.

However, this semiautomatic welding device of the prior art has a major drawback in that such devices require the operator to make two separate adjustments. The first adjustment is adjustment of the continuous feed or rate of unspooling of the filler wire. The second adjustment is adjustment of the speed of the reciprocating movement of the filler wire, which depends on the amount of power delivered to the torch and therefore on the rate of melting of the filler wire, while taking into account the amplitude of the reciprocating movement of the filler wire. These two adjustments must be performed simultaneously, requiring the operator to use both hands at the same time to act on the two adjustment means. This therefore prevents him from immediately checking in situ and in visu whether the adjustment that he has made is correct, according to the nature of the weld to be produced and the characteristics of the filler wire used for the welding.

This is because different kinds of filler wire can be used, depending on the nature of the workpieces to be welded. It will be preferred to have relatively bulky weld droplets produced at a relatively high frequency. It would also be necessary to find a good compromise between the number of droplets that it is desired to deposit per unit length and the type of welding to be carried out.

For proper adjustment, the operator must therefore find a compromise between the fixed amount of power supplied to the torch, the frequency and amplitude of the reciprocating movement of the filler wire and the continuous feed speed or rate of unspooling of the filler wire from the spool.

Adjustment is made more difficult by the fact that the filler wire may have a variable thickness and be made of a different metal or metal alloy depending on its application. The use of metals or alloys of different type means that different amounts of power must be supplied to melt them.

This operation of adjusting the parameters is irksome and meticulous, especially if the operator is required to make many adjustment operations over the course of the time he is working on many different workpieces of different type.

To make the correct adjustment, the operator must have the proper know-how. This requires having a good knowledge of the various types of welds and especially the number of droplets that should be deposited in order to obtain a suitable weld and one which is appropriate to the type or style of workpieces to be welded.

Thus, to obtain the desired weld with the correct characteristics, a fine and appropriate adjustment is required.

This is why, in the devices of the prior art, in particular in the device described in patent FR 2 723 330, two separate adjustment means have been retained so as to maintain the freedom of separately acting and controlling, on the one hand, the wire pay-out speed and, on the other hand, the speed of the reciprocating movement.

These devices of the prior art have thus allowed the freedom of acting separately on these two parameters to be preserved, so as always to have the best possible weld quality. Despite the difficulties in using these devices of the prior art, its seems that the profession accepts these devices so as to preserve the accuracy of adjustment.

The drawback with such welding devices is that, for correct efficiency, they must be handled by a relatively skilled operator. These devices therefore do not completely dispense with skilled labor, which presents the drawback of increased labor costs.

SUMMARY OF THE INVENTION

It is therefore an object of the invention to provide a welding device that retains the essential advantages afforded by the prior art devices yet solves the crucial problem of the difficulty of adjusting and maintaining a constant welding quality.

It is another object of the present invention to provide a welding device with easy-to-use operator control of the kinematic parameters (e.g., continuous feed movement and reciprocating movement) of filler wire embodied therein.

It is a further object of the present invention to provide a welding device with a single adjustment that controls the kinematic parameters (e.g., continuous feed movement and reciprocating feed movement) of the filler wire embodied therein.

It is a further object of the present invention to provide a welding device with a single motor that provides desired kinematic movement (e.g., continuous feed movement and reciprocating feed movement) of the filler wire embodied therein.

In accord with these objects, which will be discussed in detail below, an improved welding device is provided that includes a casing, a power supply unit, a carriage for continuous delivery of filler wire, conduit that carries filler wire to an outlet nozzle, and at least one motor. First wire drive means, mechanically coupled to the motor(s), imparts reciprocating movement to filler wire that is carried in the conduit to the outlet nozzle. Second wire drive means, mechanically coupled to the motor(s), imparts continuous movement to filler wire that is carried in the conduit to the outlet nozzle. A single controller is adapted to control the motor(s) to obtain desired kinematic characteristics of movement of the filler wire, preferably giving the filler wire the same kinematics as a welder's hand. The motor parameters and corresponding kinematic characteristics of the filler wire is adjusted by the single controller in response to a single operator actuated adjustment means. Preferably, a single motor is mechanically coupled to the first and second wire drive means to impart desired kinematic movement to the filler wire during operation of the single motor. Such a welding device coordinates and synchronizes continuous movement and reciprocating movement of the filler wire and makes adjustment of such movements very easy for the operator. Moreover, the device allows a very high quality of welding to be maintained, even if the device is used by an unskilled operator.

In addition, the single controller can be adapted to automatically control the amount of power delivered to device's torch for melting the filler wire in addition to the kinematic parameters of the filler wire. These kinematic parameters and torch power levels may be calculated based upon characteristic values of the filler wire and of the workpieces to be welded (which are input thereto), such as the diameter of the wire, the nature of the metal of which the wire is made, the thickness and nature of the workpieces to be welded.

In addition, thanks to its design, the device makes it possible to devise welding sets taking up less space than the devices of the prior art. This smaller size allows access to very confined places which would be inaccessible using the devices of the prior art, for example in shipbuilding.

Moreover, owing to its limited number of components, its manufacturing cost is low as the complexity of assembly is less. Manufacture is therefore more rapid. In addition, since there are a small number of parts, the purchase cost of the components is also low, the more so as these components may be readily available on the market.

Additional objects and advantages of the invention will become apparent to those skilled in the art upon reference to the detailed description taken in conjunction with the provided figures.

Figure 1:
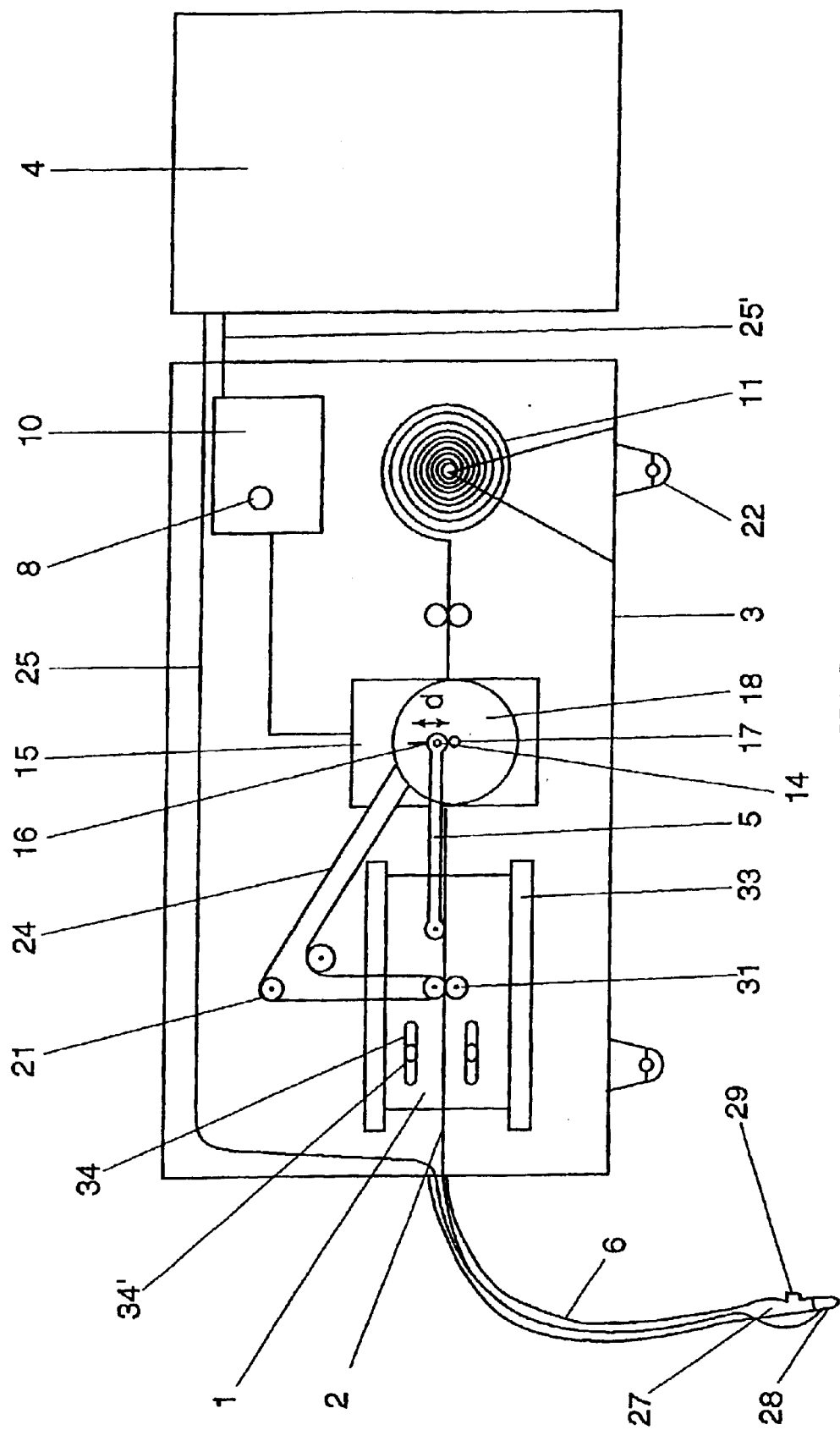
FIG. 1 is a schematic cutaway side view of a welding device according to the present invention in which one of the side walls of the body has been removed. The FIGURE shows one of the preferred embodiments of the invention, which is included here as an illustrative example and in no way constitutes a limitation of the invention.

The description and the operation of the invention will become more clearly apparent from the reference numbers of the FIGURE.

DETAILED DESCRIPTION OF THE PREFERRED EMBODIMENTS

Turning now to FIG. 1, the welding device according to the present invention comprises a body 3 (sometimes referred to as a 'casing') connected to a power supply unit 4 which may or may not be integral with the body 3. The body 3 will advantageously be provided with wheels 22 and any other means for making it easy to move, for example handles.

A carriage (in the form of spool 11) provides continuous delivery of filler wire 2. The filler wire 2 is supplied to tubing or conduit 6, which carries the filler wire 2 to an outlet nozzle 28 at the end of conduit 6. A torch 27 is also disposed at the end of conduit 6. The torch includes a button 29 (or lever, or other operator activated control mechanism) that enables the operator to selectively activate the torch 27 thereby melting the filler wire 2 disposed at the end of conduit 6.

The power supply unit 4 supplies power to motor 15 of the welding device via power cable 25'. The power supply unit 4 also supplies power to the torch 27 via a second power cable 25. Motor 15 provides complete kinematic movement of the filler wire 2, including continuous feed of filler wire 2 to the outlet nozzle 28 in addition to reciprocating movement of the filler wire 2 to the outlet nozzle 28. More specifically, the operating parameters of the motor and the corresponding kinematic parameters (e.g., reciprocation speed and feed speed) of the filler wire 2 are set by a single controller 10, preferably in response to operator input via an adjustment knob 8 (or other operator interface means) located on a control panel 10.

Reciprocating feed movement of the filler wire 2 is provided by reciprocation of a support 1 that includes a roller assembly 31 that drives the filler wire 2 toward the outlet nozzle 28 via the flexible conduit or tubing 6. The support 1 is reciprocated via mechanical coupling to the rotating shaft of the motor 15.

Continuous feed movement of the filler wire 2 is provided by a drive mechanism 24 (which may be a belt or a chain or a gear chain) that is operably coupled to the roller assembly 31, for example via pulleys 21. Drive mechanism 24 may be provided with cooperating means (such as teeth or a coating suitable) for engagement with the roller assembly 31 (and with the pulleys 21). The drive mechanism 24 is driven via mechanical coupling to the rotating shaft of the motor 15.

In this manner, the kinematic parameters (including reciprocation speed and feed speed) of the filler wire 2 are controlled by the operating parameters of motor 15, which are set by a single controller 10, preferably in response to operator input via an adjustment knob 8 (or other operator interface means) located on a control panel 10.

Preferably, the support 1 is reciprocated by the motor 15 via a reciprocating element (such as a cam or plate 18 as shown) that is coupled to the rotating shaft of the motor 15. A connecting rod 5 couples the reciprocating element (e.g., the plate 18) to the support 1 to impart reciprocating movement to the support 1 when the shaft of the motor rotates.

The connecting rod 5 may be fixed in a radial direction with respect to the center of rotation 17 of the reciprocating element (e.g., plate 18) within a suitable slot 16 formed in element 18 as shown. In this manner, the head 14 of the connecting rod 5 may slide radially with respect to the center of rotation 17. By virtue of this arrangement, an operator will be able to vary the distance 'd' between the center of rotation 17 and the center of rotation of the head of the connecting rod 14. This arrangement will allow the amplitude of the reciprocating movement of the filler wire 2 to be varied as needed.

The reciprocating element that imparts movement to the connecting rod 5 (and to support 1) may be a cam of the type having at least two bearing points, or may be a plate 18 which supports the connecting rod 5 as shown. If the reciprocating element is of the cam type, the support 1 will have to be linked to elastic or magnetic return means (not shown) in order for it to return to its initial position. Thus the reciprocating movement will be performed. The return means may be, for example, springs or magnets, preferably springs.

The reciprocating movement of support 1 may be guided in a direction substantially the same as (or in a direction substantially parallel to) the intended direction of movement of the filler wire 2 by at least one slideway 33 (two shown) and/or at least one guiding slot 34 and at least one guiding peg 34' as shown in FIG. 1.

The roller assembly 31 preferably includes at least one drive roller and at least one backing roller which cooperate so that the filler wire 2 is suitably driven toward the outlet nozzle 28 via the flexible conduit or tubing 6. When not constrained by drive mechanism 24 (e.g., belt), the drive roller(s) and backing roller(s) are fixed so as to rotate freely on the support 1. Moreover, the drive roller(s) and backing roller(s) may be profiled in such a way that the bearing surface of the drive roller(s) has a gutter-shaped profile and the backing roller(s) has a profile of complementary shape. In this way, the gripped filler wire will be properly held.

Optionally, the welding device according to the present invention may include means for preheating the filler wire, which facilitates melting of the wire.

For safety and correct operation reasons, the constituent elements of the welding device according to the present invention (including the casing 3 and the conduit 6) are preferably made, as far as possible, of electrically insulating materials, plastics, rubber or the like.

Moreover, the welding device according to the present invention may include means for recording the kinematic parameters and the amount of power that has to be delivered to melt the filler wire. These parameters are the continuous feed speed of the filler wire, the frequency of the reciprocating movement, the electrical power delivered to the torch, the nature of the metal, etc. This information may be stored, for example, in a chip incorporated into the device or any other data storage medium.

Advantageously, this data storage medium may be inserted into the control panel. Of course, a completely manual mode of operation may be preserved in the device. In this operating mode, an input for adjustment of the kinematic parameters of the filler wire is set manually via reference to a chart.

In another embodiment of the present invention, the controller 10 of the welding device as described above may be adapted to automatically control kinematic movement of the filler wire and the amount of power delivered to melt the wire. Preferably, such control operations are based upon characteristic values of the filler wire and characteristic values of the workpieces to be welded (which are input thereto). These characteristic values are, for example, the diameter of the wire, the nature of the metal of which it is made, the thickness and the nature of the workpieces to be welded, etc. An input (e.g., keypad, knobs, buttons, switches, graphical user interface, etc) is provided that cooperates with said controller 10 for this purpose.

Advantageously, the welding device according to the present invention unexpectedly makes it possible to achieve as good results as with the known devices of the prior art and to do so by dispensing with one adjustment option.

Thus, the manner whereby the objectives of the invention are achieved will have been better understood in the light of the above description.

The simplicity of the device, in terms of its use and its assembly, together with the low manufacturing cost gives it an attraction.

There have been described and illustrated herein several embodiments of a welding device and a method of controlling kinematic parameters of filler wire used therein in addition to the power levels delivered to the torch of the device. While particular embodiments of the invention have been described, it is not intended that the invention be limited thereto, as it is intended that the invention be as broad in scope as the art will allow and that the specification be read likewise. Thus, while particular types/configurations for mechanical couplings and drive mechanisms have been disclosed, it will be appreciated that other types/configurations of mechanical couplings and drive mechanisms can be used as well. It will therefore be appreciated by those skilled in the art that yet other modifications could be made to the provided invention without deviating from its spirit and scope as claimed.

I claim:

1. A welding device comprising:
   a) a casing;
   b) a power supply unit;
   c) a carriage for continuous delivery of filler wire;
   d) a conduit that carries filler wire to an outlet nozzle;
   e) at least one motor;
   f) first wire drive means, mechanically coupled to said at least one motor, for imparting reciprocating movement to filler wire that is carried in said conduit to said outlet nozzle;
   g) second wire drive means, mechanically coupled to said at least one motor, for imparting continuous movement to filler wire that is carried in said conduit to said outlet nozzle; and
   h) a single controller that is adapted to control said at least one motor to obtain desired kinematic characteristics of movement of filler wire that is carried to said outlet nozzle.

2. A welding device according to claim 1, wherein:
   said first wire drive means includes a support that is reciprocated via mechanical coupling to said at least one motor, said support having a roller assembly disposed thereon that imparts reciprocating movement to filler wire that is carried in said conduit to said outlet nozzle during operation of said at least one motor.

3. A welding device according to claim 2, wherein:
   said first wire drive means comprises a reciprocating element, coupled to said at least one motor, and a connecting rod, coupled between said reciprocating element and said support, said reciprocating element and connecting rod cooperating to impart reciprocating movement to said support during operation of said motor.

4. A welding device according to claim 3, wherein:
said reciprocating element comprises a cam of a type having at least two bearing points.

5. A welding device according to claim 3, wherein:
said reciprocating element comprises a plate.

6. A welding device according to claim 3, wherein:
said connecting rod is fixed in a radial direction with respect to a center of rotation of said reciprocating element within a slot formed in said reciprocating element.

7. A welding device according to claim 2, wherein:
said first wire drive means further comprises at least one slideway that guides reciprocating movement of said support in a direction substantially the same as intended direction of movement of said filler wire.

8. A welding device according to claim 2, wherein:
said first wire drive means further comprises at least one slideway that guides reciprocating movement of said support in a direction substantially parallel to intended direction of movement of said filler wire.

9. A welding device according to claim 2, wherein:
said first wire drive means further comprises at least one guiding slot and at least one corresponding guiding peg that guides reciprocating movement of said support in a direction substantially the same as intended direction of movement of said filler wire.

10. A welding device according to claim 2, wherein:
said first wire drive means further comprises at least one guiding slot and at least one corresponding guiding peg that guides reciprocating movement of said support in a direction substantially parallel to intended direction of movement of said filler wire.

11. A welding device according to claim 2, wherein:
said roller assembly includes at least one drive roller and at least one backing roller.

12. A welding device according to claim 1, wherein:
said second wire drive means comprises a drive mechanism operably coupled to a roller assembly, wherein said drive mechanism mechanically couples said at least one motor to said roller assembly such that said roller assembly imparts continuous feed movement to filler wire that is carried in said conduit to said outlet nozzle during operation of said at least one motor.

13. A welding device according to claim 12, wherein:
said drive mechanism is selected from the group comprising:
at least one belt, at least one chain, and at least one gear train.

14. A welding device according to claim 12, wherein:
said second wire drive means further comprises pulleys that mechanically couple said drive mechanism to said at least one motor.

15. A welding device according to claim 14, wherein:
said drive mechanism includes engagement means that provide mechanical engagement with said pulleys and with said roller assembly.

16. A welding device according to claim 15, wherein:
said engagement means comprises one of teeth and a coating suitable for favorable engagement.

17. A welding device according to claim 12, wherein:
said roller assembly includes at least one drive roller and at least one backing roller.

18. A welding device according to claim 1, wherein:
said kinematic characteristics include reciprocation speed and feed speed of filler wire.

19. A welding device according to claim 1, wherein:
said carriage is in the form of a spool.

20. A welding device according to claim 1, wherein:
said at least one motor comprises a single motor that is controlled by said single controller in response to operator adjustment of an adjustment means disposed on a control panel.

21. A welding device according to claim 20, wherein:
said first wire drive means includes a support that is reciprocated via mechanical coupling to said single motor, said support having a roller assembly disposed thereon that imparts reciprocating movement to filler wire that is carried in said conduit to said outlet nozzle during operation of said single motor; and said second wire drive means comprises a drive mechanism operably coupled to said roller assembly, wherein said drive mechanism mechanically couples said single motor to said roller assembly such that said roller assembly imparts continuous feed movement to filler wire that is carried in said conduit to said outlet nozzle during operation of said single motor.

22. A welding device according to claim 21, wherein:
said roller assembly includes at least one drive roller and at least one backing roller.

23. A welding device according to claim 1, further comprising:
i) a torch disposed at the end of said conduit and including an operator actuated control mechanism that enables operator to selectively activate said torch thereby melting filler wire disposed at the end of conduit.

24. A welding device according to claim 1, further comprising:
i) means for preheating the filler wire.

25. A welding device according to claim 1, wherein:
said casing and said conduit are made of electrically insulating materials.

26. A welding device according to claim 1, wherein:
said kinematic characteristics and an amount of power delivered to melt said filler wire are recorded in a semiconductor chip.

27. A welding device according to claim 26, further comprising:
i) a control box in which said semiconductor chip is disposed.

28. A welding device according to claim 1, wherein:
said device is adapted to be operated in a manual mode of operation wherein an input for adjustment of said kinematic characteristics is set manually via reference to a chart.

29. A welding device according to claim 1, wherein:
said single controller is adapted to automatically adjust said kinematic characteristics and level of power delivered to melt said filler wire based upon characteristic values of said filler wire and characteristic values of at least one workpiece to be welded.

30. A welding device according to claim 29, wherein:
said characteristic values of said filler wire include at least one of diameter of said filler wire, nature of the metal of which said filler wire is made.

31. A welding device according to claim 29, wherein:
said characteristic values of at least one workpiece to be welded include at least one of thickness and nature of at least one workpiece to be welded.

32. A welding device according to claim 29, further comprising:
input means for inputting said characteristic values of said filler wire and said characteristic values of at least one workpiece to be welded.

* * * * *